(12) United States Patent
Aufderheide et al.

(10) Patent No.: US 12,168,467 B2
(45) Date of Patent: Dec. 17, 2024

(54) ENERGY OPTIMISATION DURING OPERATION OF A RAIL VEHICLE FLEET

(71) Applicant: SIEMENS MOBILITY GMBH, Munich (DE)

(72) Inventors: Helge Aufderheide, Munich (DE); Udhayaraj Sivalingam, Unterschleissheim (DE)

(73) Assignee: Siemens Mobility GmbH, Munich (DE)

( * ) Notice: Subject to any disclaimer, the term of this patent is extended or adjusted under 35 U.S.C. 154(b) by 962 days.

(21) Appl. No.: 17/272,404

(22) PCT Filed: Jul. 24, 2019

(86) PCT No.: PCT/EP2019/069863
§ 371 (c)(1),
(2) Date: Mar. 1, 2021

(87) PCT Pub. No.: WO2020/043397
PCT Pub. Date: Mar. 5, 2020

(65) Prior Publication Data
US 2021/0331725 A1 Oct. 28, 2021

(30) Foreign Application Priority Data
Aug. 31, 2018 (DE) ..................... 10 2018 214 813.9

(51) Int. Cl.
*B61L 27/16* (2022.01)
*G06N 3/08* (2023.01)
*G06N 20/00* (2019.01)
(52) U.S. Cl.
CPC ................ *B61L 27/16* (2022.01); *G06N 3/08* (2013.01); *G06N 20/00* (2019.01); *B61L 2205/04* (2013.01)

(58) Field of Classification Search
CPC .. B61L 27/16; B61L 15/0058; B61L 2205/04; B61L 27/10; G06N 20/00; G06N 3/08
See application file for complete search history.

(56) References Cited

U.S. PATENT DOCUMENTS 7,618,011 B2 * 11/2009 Oleski ................. B61L 15/0036
701/19
7,822,491 B2 * 10/2010 Howlett .............. B61L 15/0058
246/27

(Continued)

FOREIGN PATENT DOCUMENTS

DE 102010041078 A1 3/2012
DE 102011106440 A1 * 1/2013 .......... B61L 27/0027

(Continued)

OTHER PUBLICATIONS

Zhou Rui et al: "Optimal automatic train operation via deep reinforcement learning"; 2018 Tenth International Conference On Advanced Computational Intelligence (ICACI); IEEE; pp. 103-108; XP033356736; DOI: 10.1109/ICACI.2018.8377589.

*Primary Examiner* — S. Joseph Morano
*Assistant Examiner* — Cheng Lin
(74) *Attorney, Agent, or Firm* — Laurence A. Greenberg; Werner H. Stemer; Ralph E. Locher

(57) ABSTRACT

A method for energy-optimized operation of a rail vehicle fleet. The fleet includes n rail vehicles, each with a state-influencing system for influencing a vehicle state to generate and/or consume electrical energy and a computer unit trained by machine learning. For every i of 1 to n during operation of the rail vehicle fleet an action to be applied to the state-influencing system of the i-th rail vehicle is selected by the computer unit of the i-th rail vehicle while taking into account at least one target criterion for the i-th rail vehicle and according to vehicle, location, and/or route-related status parameters. The action, when applied to the (Continued)

state-influencing system of the i-th rail vehicle, contributes to the optimization of an electrical total energy balance of the state-influencing systems of the rail vehicle fleet, and the selected action is applied to the state-influencing system of the i-th rail vehicle.

15 Claims, 3 Drawing Sheets

(56) References Cited

U.S. PATENT DOCUMENTS

| | | | | |
|---|---|---|---|---|
| 9,811,102 | B2* | 11/2017 | Gulli' | G06N 20/00 |
| 10,029,714 | B2* | 7/2018 | Seaton | B61L 27/10 |
| 2007/0233335 | A1* | 10/2007 | Kumar | G05B 13/021 |
| | | | | 701/22 |
| 2017/0021845 | A1* | 1/2017 | Zhebrak | B61L 25/026 |

FOREIGN PATENT DOCUMENTS

| | | |
|---|---|---|
| DE | 102016116414 A1 | 3/2018 |
| EP | 3213974 A1 * | 9/2017 ......... B61L 27/0027 |

* cited by examiner

ENERGY OPTIMISATION DURING OPERATION OF A RAIL VEHICLE FLEET

BACKGROUND OF THE INVENTION

Field of the Invention

The invention relates to a method for energy-optimized operation of a rail vehicle fleet comprising multiple rail vehicles, each of which comprises a state influencing system for vehicle state influencing, which can generate and/or consume electrical energy. Furthermore, the invention concerns a fleet of rail vehicles with multiple such rail vehicles.

Normally, a rail vehicle has to meet one or more predetermined target criteria during operation. For example, it may be provided that the rail vehicle should adhere to a predetermined timetable, must not exceed a maximum permissible driving speed and/or must keep an interior temperature within a predetermined temperature interval.

As a rule, a rail vehicle is operated by means of its state influencing system in such a way that the specified target criterion or the specified target criteria is or are met (as far as possible). A state influencing system of a rail vehicle is used to influence the state of the rail vehicle. For example, the state influencing system can be used to change the speed of the rail vehicle and/or an interior temperature of the rail vehicle.

When a change of the state of the rail vehicle occurs, the state influencing system can consume and/or generate electrical energy. For example, the state influencing system can generate electrical energy for accelerating the rail vehicle by means of an electric traction motor or can generate electrical energy when braking the rail vehicle by means of a recuperation brake.

In the case of a fleet of rail vehicles which comprises multiple rail vehicles, usually each of the rail vehicles must comply with one or more of its own target criteria during operation. Accordingly, the individual rail vehicles of the rail vehicle fleet are usually operated by means of their state influencing systems in such a way that the rail vehicles comply with these target criteria (as far as possible).

In general, an operator of a fleet of rail vehicles wishes to optimize the overall electrical energy balance of the state influencing systems of the rail vehicle fleet (i.e. to reduce the electrical energy consumption of the state influencing systems of the rail vehicle fleet and/or to increase the electrical energy generation of the state influencing systems).

SUMMARY OF THE INVENTION

One object of the present invention is to enable an energy-optimized operation of a rail vehicle fleet comprising multiple rail vehicles.

This object is achieved according to the invention by a method as claimed as well as by a rail vehicle fleet as claimed.

Advantageous embodiments of the invention are the subject matter of the dependent claims as well as the following description.

With the method according to the invention for the energy-optimized operation of a rail vehicle fleet, the rail vehicle fleet comprises n rail vehicles, each of which comprises a vehicle state influencing system for influencing the vehicle state, which can generate and/or consume electrical energy, as well as a computer unit trained by means of a machine learning method, wherein n is a natural number and is greater than 1. In addition, with the method according to the invention, for all i from 1 to n, during the operation of the rail vehicle fleet, the computer unit of the i-th rail vehicle of the n rail vehicles, taking into account at least one target criterion for the i-th rail vehicle and depending on the vehicle-related, location-related and/or route-related state parameters, selects an action to be applied to the state influencing system of the i-th rail vehicle, which contributes to the optimization of an overall electrical energy balance of the state influencing system of the rail vehicle fleet when applied to the state influencing system of the i-th rail vehicle, and the selected action is applied to the state influencing system of the i-th rail vehicle, where i is a natural number.

The use of computer units trained by a machine learning method to select the actions for the state influencing systems of the rail vehicle fleet has the advantage that it is possible to dispense with implementing numerous situation-dependent rules in the computer units of the rail vehicle fleet in order to select actions for the state influencing systems of the rail vehicle fleet in the respective situation, which allow an optimization of the overall electrical energy balance of the rail vehicle fleet.

Since the computer units of the rail vehicle fleet are trained by means of a machine learning method, the computer units can independently select actions for the state influencing systems which enable an optimization of the electrical overall energy balance of the state influencing systems based on their previous (possibly still ongoing) training without an explicit implementation of situation-dependent rules based on their previously learned knowledge in the respective situation. In other words, the machine-learning-based training of the computer units of the rail vehicle fleet gives the rail vehicles a kind of "swarm intelligence" that allows the rail vehicles to select suitable actions for their state influencing systems in the respective situation, which enable optimization of the overall electrical energy balance of the state influencing systems.

The fact that the selection of the action for the state influencing system of the i-th rail vehicle, taking into account at least one target criterion for the i-th rail vehicle and depending on the vehicle-related, location-related and/or route-related state parameters, allows the computer unit of the i-th rail vehicle to select the action for the state influencing system in the respective situation under the boundary condition such that the action enables the i-th rail vehicle to (at least approximately) adhere to the corresponding target criterion.

The phrase "for all i from 1 to n" also refers to the preferred embodiments mentioned in the following description and to the dependent claims in which reference is made to the "i-th" rail vehicle. In other words, the characteristics described below, which refer to the "i-th" rail vehicle, apply to all n rail vehicles in the rail vehicle fleet.

The rail vehicles in the rail vehicle fleet may each be a single rail vehicle carriage or a combination of multiple intercoupled rail vehicle carriages.

A state influencing system of a rail vehicle is in the present case to be understood as a system the components of which can influence a vehicle state of the rail vehicle, such as the driving speed, an interior temperature of the rail vehicle or the like. In the case of a vehicle state being influenced, electrical energy may be consumed and/or generated by the state influencing system or at least some of its components.

The consumption of electrical energy due to the state influencing system of the respective rail vehicle is appropriately incorporated into the overall electrical energy balance of the state influencing systems of the n rail vehicles with a negative sign, while the generation of electrical energy by the state influencing system of the respective rail vehicle is appropriately incorporated into the overall energy balance with a positive sign.

The state influencing system of the respective rail vehicle is preferably set up to obtain electrical energy from an electrical energy/electricity grid and/or to feed electrical energy into the energy/electricity grid.

In a preferred way, the rail vehicles of the vehicle fleet are supplied with electrical energy via the same energy/electricity grid. The respective rail vehicle of the rail vehicle fleet can be supplied with electrical energy in particular by a contact line, such as an overhead line or a conductor rail.

In particular, the individual rail vehicles in the rail vehicle fleet may be underway on the same rail network or may be located on the same rail network.

The computer unit of the respective rail vehicle is conveniently equipped with a data memory in which data and/or a computer program can be stored. Furthermore, it is advantageous if the computer unit of the respective rail vehicle is equipped with a processor in which a computer program can be executed.

The selection of the respective action does not necessarily take place at the same time for the n rail vehicles. In other words, the selection of the respective action by the respective computer unit can be offset in time in the case of the individual rail vehicles of the rail vehicle fleet. Furthermore, the application of the respective action to the individual rail vehicles of the rail vehicle fleet may be offset in time.

The state parameters, depending on which the action was selected by the computer unit of the respective rail vehicle, may relate to the respective rail vehicle (in particular its driving state), to the location where the respective rail vehicle is located and/or to the route ahead of the rail vehicle.

The action selected by the computer unit of the i-th rail vehicle may be an action to be applied to a single component of the state influencing system of the i-th rail vehicle. Alternatively, the action selected by the computer unit of the i-th rail vehicle may include multiple, in particular, different sub-actions that relate to different components of the state influencing system of the i-th rail vehicle. Appropriately, the action selected by the computer unit of the i-th rail vehicle is applied to the corresponding component/s of the state influencing system of the i-th rail vehicle.

In a preferred manner, the action selected by the respective computer unit is selected from a list of possible actions, which can be stored, for example, in the respective computer unit or in the data memory thereof.

In a possible embodiment variant of the invention, the action selected by the computer unit of the respective rail vehicle is output via an output device, such as a display, of the respective rail vehicle and the application of the selected action to the state influencing system of the rail vehicle is initiated by a driver of the vehicle by means of an operating element of the rail vehicle. Alternatively, the action selected by the computer unit of the respective rail vehicle can be initiated automatically by the computer unit, i.e. without prior approval by a driver of the vehicle (and if necessary without notifying the driver of the vehicle accordingly). In the latter case, the computer unit of the respective rail vehicle can, for example, automatically generate a control signal for the execution of the selected action and transmit it to the corresponding components of the state influencing system of the rail vehicle.

The action selected by the computer unit of the i-th rail vehicle may include switching on one or more components of the state influencing system of the i-th rail vehicle, switching off one or more components of this state influencing system, changing a control variable (such as a revolution rate) of one or more components of this state influencing system and/or changing an operating mode of one or more components of this state influencing system.

The above-mentioned target criterion for the i-th rail vehicle may relate in particular to a timetable to be adhered to by the i-th rail vehicle. For example, the intended criterion for the i-th rail vehicle may determine the maximum time period by which the arrival time of the i-th rail vehicle at a station/stop may deviate from the arrival time of the i-th rail vehicle provided for in the timetable.

In addition, it may be provided that the action is selected by the computer unit of the i-th rail vehicle by taking into account multiple target criteria for the i-th rail vehicle.

At least some of the target criteria can, for example, relate to a vehicle interior temperature of the i-th rail vehicle, a temperature of a (to be cooled) vehicle component of the i-th rail vehicle, an upper limit for a contact line voltage at the location of the i-th rail vehicle, a lower limit for a contact line voltage at the location of the i-th rail vehicle, a minimum permissible distance from a rail vehicle ahead and/or a minimum permissible distance from a rail vehicle behind. The respective target criterion is conveniently placed in the data memory of the computer unit of the i-th rail vehicle.

By taking into account target criteria for the i-th rail vehicle, which relate to the lower and upper limits of the contact line voltage at the location of the i-th rail vehicle for example, it is possible to operate the rail vehicles of the rail vehicle fleet in such a way that the contact line voltage is kept stable at the location of the respective rail vehicle (between the upper limit and the lower limit). Thus, at the location of the respective rail vehicle, a contact line voltage markedly differing from the normal value thereof (i.e. a contact line voltage exceeding/less than the upper/lower limit), which could lead to damage to the respective rail vehicle and/or to its emergency shutdown for example, can be avoided.

The state parameters, depending on which the action is selected by the computer unit of the i-th rail vehicle, may in particular include a current contact line voltage at the location of the i-th rail vehicle and/or one or more statistical contact line voltage values at the location of the i-th rail vehicle.

For example, a statistical contact line voltage value, depending on which the action by the computer unit of the i-th rail vehicle is selected, may be an average or normal value of the contact line voltage at the location of the i-th rail vehicle. Another statistical contact line voltage value, depending on which the action is selected by the computer unit of the i-th rail vehicle, may be, for example, an average voltage tolerance or average voltage fluctuation of the contact line voltage at the location of the i-th rail vehicle.

Advantageously, the action selected by the computer unit of the i-th rail vehicle is an action that helps to ensure that the current contact line voltage of the i-th rail vehicle deviates as little as possible from the average/normal value of the contact line voltage at the location of the i-th rail vehicle.

The respective statistical contact line voltage value at the location of the i-th rail vehicle, depending on which the action is selected by the computer unit of the i-th rail vehicle, may be stored in a data memory of the i-th rail vehicle or alternatively transmitted by radio from a control centre to the computer unit of the i-th rail vehicle. Furthermore, the respective statistical contact line voltage value may be a time-dependent voltage value, in particular a time of day-dependent and/or date-dependent voltage value.

In a preferred embodiment variant of the invention, the action selected by the computer unit of the i-th rail vehicle is selected depending on the deviation between the current contact line voltage at the location of the i-th rail vehicle and the average contact line voltage at the location of the i-th rail vehicle.

The state parameters, depending on which the action is selected by the computer unit of the i-th rail vehicle, can, among other things, be a position of the i-th rail vehicle, a driving speed of the i-th rail vehicle, a braking system state of the i-th rail vehicle, at least one weather parameter at the location of the i-th rail vehicle, a distance from a rail vehicle in front, a distance from a rail vehicle behind, at least one infrastructure parameter and/or at least one route parameter.

Weather parameters can, for example, include an outside temperature and/or a rainfall per unit time. Route parameters may include, inter alia, a maximum permitted driving speed in a section of the route ahead, a curve radius of the section of the route ahead and/or a gradient of the section of the route ahead. Infrastructure parameters can include, for example, the states of trackside signal systems and/or positions of switches.

Appropriately, the state influencing system of the respective rail vehicle comprises at least one electric traction motor. It may be provided that the action selected by the computer unit of the i-th rail vehicle is applied at least to the traction motor of the state influencing system of the i-th rail vehicle.

In particular, a driving speed of the i-th rail vehicle can be changed, i.e. increased or reduced. A reduction in the driving speed of the i-th rail vehicle can be achieved by means of its traction motor, for example, by switching the traction motor from the traction mode to the braking mode.

Furthermore, the state influencing system of the respective rail vehicle may include at least one air conditioning system. It may be provided that the action selected by the computer unit of the i-th rail vehicle is applied at least to the air conditioning system of the state influencing system of the i-th rail vehicle. In this case, for example, an interior temperature of the i-th rail vehicle may be increased or reduced.

Furthermore, it is appropriate if the state-influencing system of the respective rail vehicle comprises at least one braking system. It may be provided that the action selected by the computer unit of the i-th rail vehicle is applied at least to the braking system of the i-th rail vehicle. For example, the driving speed of the i-th rail vehicle may be reduced.

Furthermore, the state influencing system of the respective rail vehicle may have at least one energy store for providing electrical energy. In this case, it may be provided that the action selected by the computer unit of the i-th rail vehicle is applied at least to the energy store of the state influencing system of the i-th rail vehicle. In particular, the energy store of the i-th rail vehicle may be charged or discharged.

The energy store may include, for example, a galvanic cell or a combination of multiple, in particular similar, galvanic cells. Alternatively or additionally, the energy store may include a capacitor, such as a so-called supercapacitor, or a combination of multiple, in particular similar capacitors.

In a possible design variant, the energy store includes a flywheel as well as an electric motor, which is/can be coupled to the flywheel and can be operated as a generator. Using electrical energy, the electric motor can drive the flywheel. The flywheel can store the energy it absorbs from the electric motor as rotational energy. Conversely, if the energy store is to provide electrical energy, the flywheel can use the rotational energy thereof to drive the electric motor during generator mode.

Advantageously, the computer units of the n rail vehicles each comprise an artificial neural network trained by means of a machine learning method, in particular a deep artificial neural network. Artificial neural networks have proven themselves to learn complex relationships/dependencies between different parameters and target criteria to be adhered to on the basis of training data. The artificial neural network of the respective computer unit is conveniently implemented in the data memory thereof. Preferably, the selection of the action is carried out by the computer unit of the i-th rail vehicle by means of the artificial neural network thereof.

In a preferred embodiment variant of the invention, the artificial neural network of the respective computer unit is a perceptron network, in particular a multilayer perceptron network.

The artificial neural networks of the n computer units may have the same network topology. Alternatively, the artificial neural networks of the n computer units may have different (network) topologies. Furthermore, the artificial neural networks of the n computer units may be formed in such a way that the artificial neural networks exhibit a time-dependent and/or stochastic behavior, in particular to avoid resonance phenomena.

The computer unit of the i-th rail vehicle, in particular the artificial neural network thereof, is advantageously trained from an initially untrained state by means of the said machine learning method during the operation of the rail vehicle fleet, taking into account at least one target criterion for the i-th rail vehicle and depending on the vehicle-related, location-related and/or route-related state parameters, to select an action to be applied to the state influencing system of the i-th rail vehicle which contributes to the optimization of the overall electrical energy balance of the state influencing systems of the rail vehicle fleet when applied to the state influencing system of the i-th rail vehicle. The training of the respective computer unit is advantageously based on training data, which can be based on a simulation or measurements, for example.

In a preferred way, the machine learning method, by means of which the respective computer unit is trained, is a supervised learning method, such as a back propagation method or an online method.

The training can include multiple consecutive training runs. Advantageously, a set of state parameters is transmitted to the computer unit of the i-th rail vehicle in each training run and an action is selected to be applied to the state influencing system of the i-th rail vehicle depending on the state parameters received by it and taking into account at least one target criterion for the i-th rail vehicle.

Furthermore, it is advantageous if, in each training run, an electrical total energy balance of the state influencing systems of the rail vehicle fleet is calculated on the basis of the actions selected by the computer units of the n rail vehicles during the respective training run and a reward is determined for each of the computer units on the basis of this calculated total energy balance.

The set of state parameters for the respective training run that is transmitted to the computer unit of the i-th rail vehicle can be generated by a simulation unit, for example.

As mentioned at the beginning, the invention concerns, among other things, a fleet of rail vehicles.

The rail vehicle fleet according to the invention comprises n rail vehicles, each of which comprises a state influencing system for vehicle state influencing, which can generate and/or consume electrical energy, and a computer unit trained by a machine learning method, where n is a natural number and greater than 1. In the rail vehicle fleet according to the invention, it is provided for all i from 1 to n, where i is a natural number, that the computer unit of the i-th rail vehicle of the n rail vehicles is set up to select an action to be applied to the state influencing system of the i-th rail vehicle during operation of the rail vehicle fleet while observing at least one target criterion for the vehicle, as well as depending on the vehicle-related, location-related and/or route-related state parameters, which action is used for the purpose of optimization of an overall electrical energy balance of the state influencing systems of the rail vehicle fleet when applied to the state influencing system of the i-th rail vehicle.

Further embodiments, embodiment details and advantages described above in connection with the method according to the invention may also refer to the rail vehicle fleet according to the invention.

The method according to the invention can preferably be carried out with the help of the rail vehicle fleet according to the invention.

The previously given description of preferred embodiments of the invention contains numerous features, some of which are reproduced combined in multiples in the individual dependent claims. However, these features can also be considered individually and combined into meaningful further combinations. In particular, these features can each be combined individually and in any suitable combination with the method according to the invention and the rail vehicle fleet according to the invention. Furthermore, method features may also be regarded as a property of the corresponding device unit.

The properties, features, and advantages of the invention described above, as well as the way in which these are achieved, become clearer and more explicit in connection with the following description of an exemplary embodiment of the invention, which is explained in more detail in connection with the figures. The exemplary embodiment serves to explain the invention and does not limit the invention to the combinations of features specified therein, even with respect to functional features. In addition, suitable features of the exemplary embodiment can also be considered explicitly in isolation and may be combined with any of the claims.

DETAILED DESCRIPTION OF THE INVENTION

Figure 1:
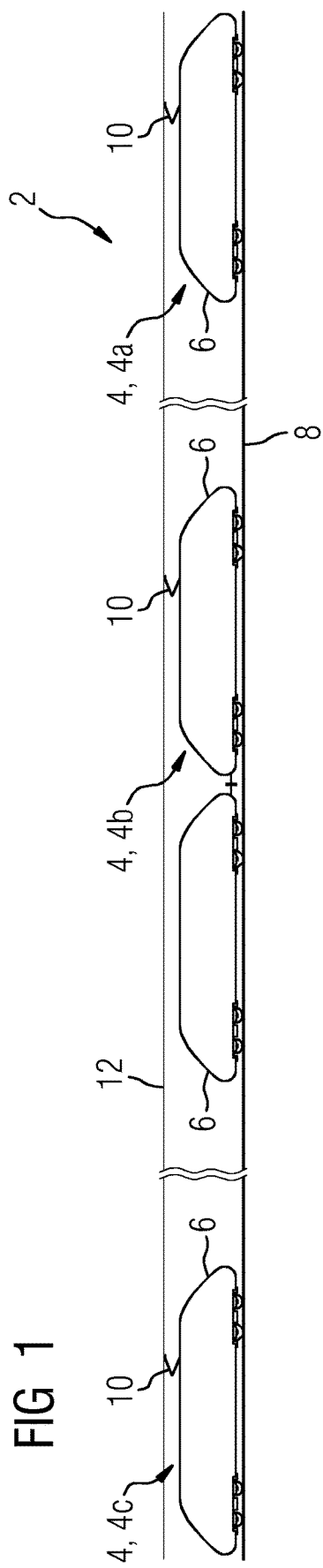
FIG. 1 shows a fleet of rail vehicles comprising multiple rail vehicles.

FIG. 1 shows a rail vehicle fleet 2, which comprises multiple rail vehicles 4. More specifically, the rail vehicle fleet 2 includes a first rail vehicle 4a, a second rail vehicle 4b and a third rail vehicle 4c.

The first and third rail vehicles 4a, 4c each have exactly one carriage 6. The second rail vehicle 4b, on the other hand, comprises two coupled carriages 6.

The number of rail vehicles 4 of the rail vehicle fleet 2 as well as their respective number of carriages 6 are chosen arbitrarily in the present exemplary embodiment. In other words, in principle the rail vehicle fleet 2 may comprise a different number of rail vehicles 4. In addition, rail vehicles 4 of the rail vehicle fleet 2 may each have a different number of carriages 6.

In the present exemplary embodiment, the rail vehicles 4 of the rail vehicle fleet 2 are underway on the same track 8, wherein this is not a necessary condition for the invention.

The rail vehicles 4 of the rail vehicle fleet 2 each have a pantograph 10, which is in contact with a contact line 12 in the form of an overhead line. Each of the rail vehicles 4 can obtain 10 electrical energy from the contact line 12 or can feed electrical energy into the contact line 12 using its pantograph, depending on the operating state.

Figure 2:
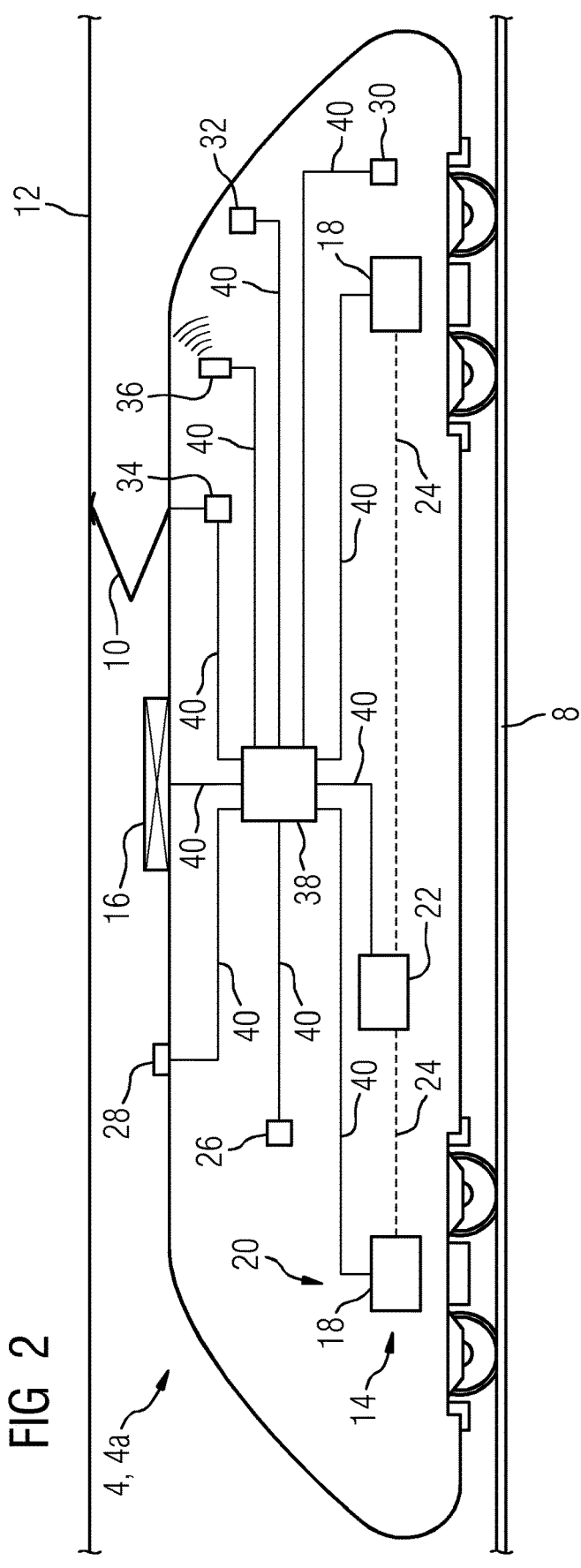
FIG. 2 shows one of the rail vehicles in the rail vehicle fleet from FIG. 1.

FIG. 2 shows the first rail vehicle 4a of the rail vehicle fleet 2.

The other rail vehicles 4b, 4c of the rail vehicle fleet 2 are equipped with the same devices as the first rail vehicle 4a and the following remarks also apply analogously to the other rail vehicles 4b, 4c of the rail vehicle fleet 2.

The first rail vehicle 4a comprises a state influencing system 14 for vehicle state influencing, which comprises multiple components. The components of the state influencing system 14 include a climate control system 16 for the air conditioning of a vehicle interior as well as multiple electric traction motors 18. The traction motors 18 can be used (in generator mode) as electric brakes and form elements of a braking system 20 of the first rail vehicle 4a.

Another component of the state influencing system 14 is an energy store 22 for storing electrical energy. The traction motors 18 are connected to the energy store 22 via energy transmission lines 24, so that the traction motors 18 can obtain electrical energy from the energy store 22 or can charge the energy store with electrical energy, depending on the operating state.

In addition, the first rail vehicle 4a comprises a plurality of devices for capturing state parameters. These include a first temperature sensor 26 for measuring an interior temperature of the first rail vehicle 4a, a second temperature sensor 28 for measuring the outside temperature and a speed sensor 30 for measuring the driving speed of the first rail vehicle 4a. Other devices for capturing state parameters are a position detection device 32, such as a GPS receiver, as well as a voltage meter 34 for measuring the current contact line voltage at the location of the first rail vehicle 4a.

In addition, the first rail vehicle 4a includes a radio device 36 for sending and receiving data by means of radio waves. Using the radio device 36, the first rail vehicle 4a can exchange data with a control centre and/or with the other rail vehicles 4b, 4c of the rail vehicle fleet 2. For example, the rail vehicles 4 of the rail vehicle fleet 2 can exchange position data via their radio devices, by means of which the distances of the rail vehicles 4 from each other can be determined.

Figure 3:
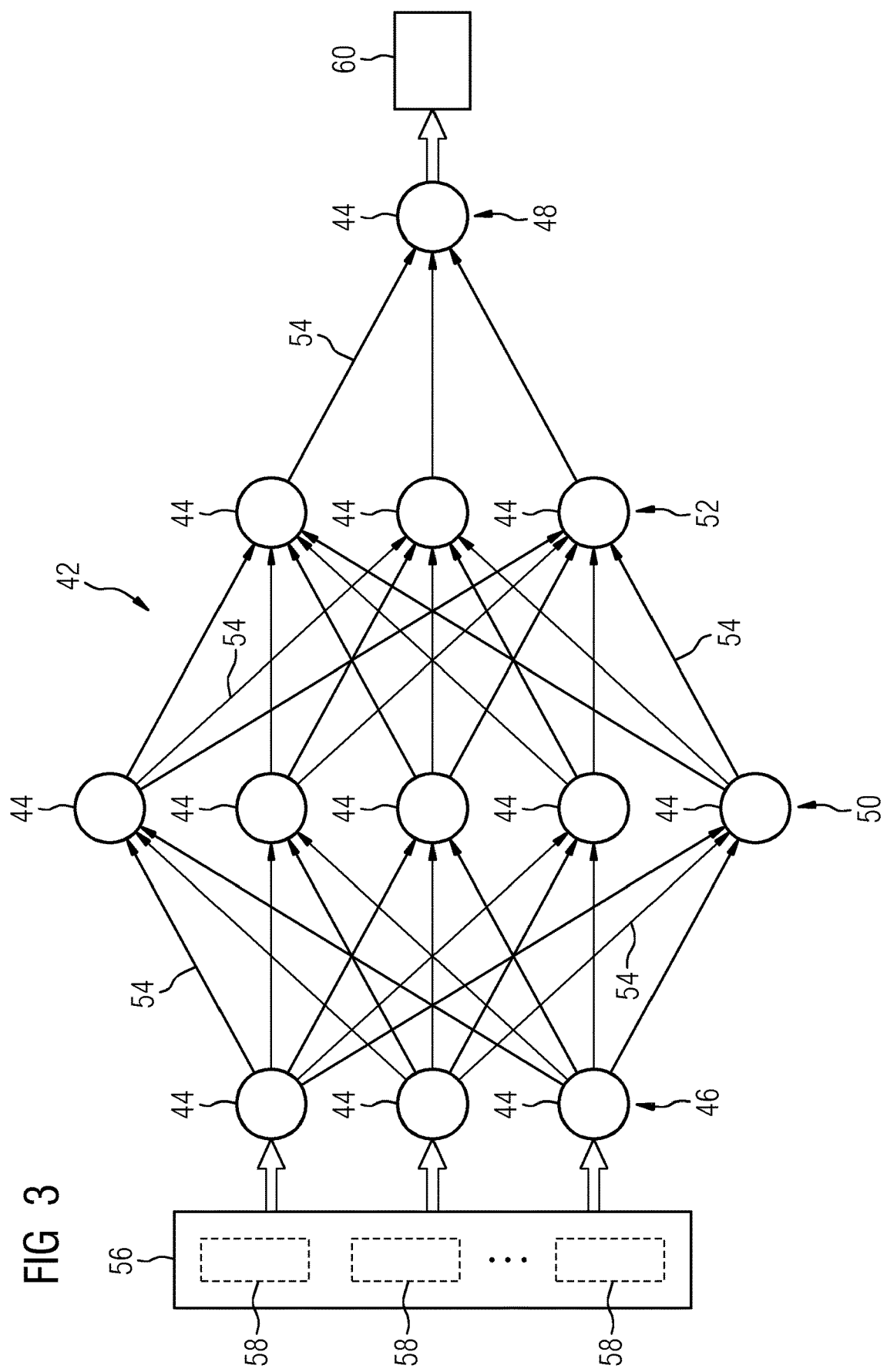
FIG. 3 shows schematically a representation of an artificial neural network of one of the rail vehicles.

Furthermore, the first rail vehicle 4a comprises a computer unit 38, in the data memory of which an artificial neural network trained by means of a machine learning method is implemented (cf. FIG. 3). The computer unit 38 is connected to the previously mentioned devices of the first rail vehicle 4a (i.e. the air conditioning 16, the traction motors 18, the energy store 22, the sensors 26-30, the position detection device 32, the voltage meter 34 and the radio device 36) via signal lines 40 and is set up to control said devices.

During the operation of the first rail vehicle 4a, multiple state parameters are captured by its devices, such as the interior temperature of the first rail vehicle 4a, the speed of the first rail vehicle 4a, the position of the first rail vehicle 4a and the current contact line voltage at the location of the first rail vehicle 4a, and are transmitted to the computer unit 38 of the first rail vehicle 4a. Furthermore, the first rail vehicle 4a receives via its radio device 36 the positions of the other rail vehicles 4b, 4c of the rail vehicle fleet 2 and forwards these state parameters to its computer unit 38. In addition, the first rail vehicle 4a receives from a control center the average/normal value of the contact line voltage at the location of the first rail vehicle 4a as well as the average voltage fluctuation of the contact line voltage at the location of the first rail vehicle 4a via its radio device 36 and also forwards these state parameters to its computer unit 38.

Depending on the state parameters and taking into account multiple predetermined target criteria for the first rail vehicle 4a, the computer unit 38 of the first rail vehicle 4a selects an action to be applied to the state influencing system 14 of the first rail vehicle 4a, which contributes to the optimization of an overall electrical energy balance of the state influencing systems 14 of the rail vehicle fleet 2 when applied to this state influencing system 14. Subsequently, the selected action is applied by the computer unit 38 to the state influencing system 14 of the first rail vehicle 4a.

The target criteria for the first rail vehicle 4a may be based, inter alia, on a timetable to be complied with by the first rail vehicle 4a, on a vehicle interior temperature (depending on the outside temperature), an upper limit on the contact line voltage at the location of the first rail vehicle 4a, a lower limit for the contact line voltage at the location of the first rail vehicle 4a, a permissible minimum distance from the other rail vehicles 4b, 4c of the rail vehicle fleet 2 and/or a maximum permissible driving speed.

For example, the target criteria may provide that the delay of the first rail vehicle 4a should not exceed a specified maximum duration compared to the timetable to be observed, the driving speed of the first rail vehicle 4a should not exceed a maximum permissible driving speed, the deviation of the vehicle interior temperature of the first rail vehicle 4a from the vehicle interior temperature to be observed should not exceed a predetermined maximum value, the distance of the first rail vehicle 4a from the other rail vehicles 4b, 4c should not fall below the permissible minimum distance and/or the contact line voltage at the location of the first rail vehicle 4a should not exceed/fall below the said upper and lower limits.

The action selected by the computer unit 38 of the first rail vehicle 4a may be switching on one or more components of the state influencing system 14 of the first rail vehicle 4a, switching off one or more components of this state influencing system 14, a change of a control variable of one or more components of this state influencing system 14 and/or a change of an operating mode of one or more components of this state influencing system 14.

By applying the selected action to the state influencing system 14 of the first rail vehicle 4a, the total electrical energy balance of all state influencing systems 14 of the rail vehicle fleet 2 is optimized and ensures that the target criteria for the respective rail vehicle 4 are met.

FIG. 3 shows a schematic representation of an artificial neural network 42 of one of the computer units 38 of the rail vehicle fleet 2. The artificial neural networks of the other computer units 38 of the rail vehicle fleet 2 can each have a structure like the artificial neural network 42 from FIG. 3 or a similar structure.

The artificial neural network 42 shown in FIG. 3 comprises a variety of artificial neurons 44, which have multiple layers. In the present case, the neurons 44 form an input layer 46, an output layer 48 and a first intermediate layer 50 and a second intermediate layer 52 between the input layer 46 and the output layer 48.

In the artificial neural network 42 from FIG. 3, the input layer 46 and the second intermediate layer 52 comprise three neurons 44, while the first intermediate layer 50 comprises five neurons 44 and the output layer 48 comprises one neuron 44, wherein the number of neurons 44 of the respective layer 46-52 was chosen only as an example.

The individual layers 46-52 of the artificial neural network 42 are linked by neuron connections 54, each connecting two of the neurons 44. In the present case, each neuron 44 of the input layer 46 is connected to each neuron 44 of the first intermediate layer 52. Furthermore, the neurons 44 of the first intermediate layer 50 are each connected to each neuron 44 of the second intermediate layer 52. Each neuron 44 of the second intermediate layer 52 is in turn connected to the neuron 44 of the output layer 48.

The artificial neural network 42 is implemented in the data memory of one of the computer units 38 of the rail vehicle fleet 2. In the trained state, the artificial neural network 42 is used to select an action for the rail vehicle 4 to which the computer unit 38 belongs, which action is then applied to the state influencing system 14 of the said rail vehicle 4 and contributes to an optimization of the overall electrical energy balance of the state influencing systems 14 of the rail vehicle fleet 2.

For this purpose, a data set 56, which comprises multiple state parameters 58, is transmitted to the input layer 46 of the artificial neural network 44. Depending on the state parameter 58 transmitted to the input layer 46 and taking into account at least one predetermined target criterion, the artificial neural network 42 selects (for example from a list of multiple possible actions) the action 60 to be applied and outputs it via its output layer 48.

Figure 4:
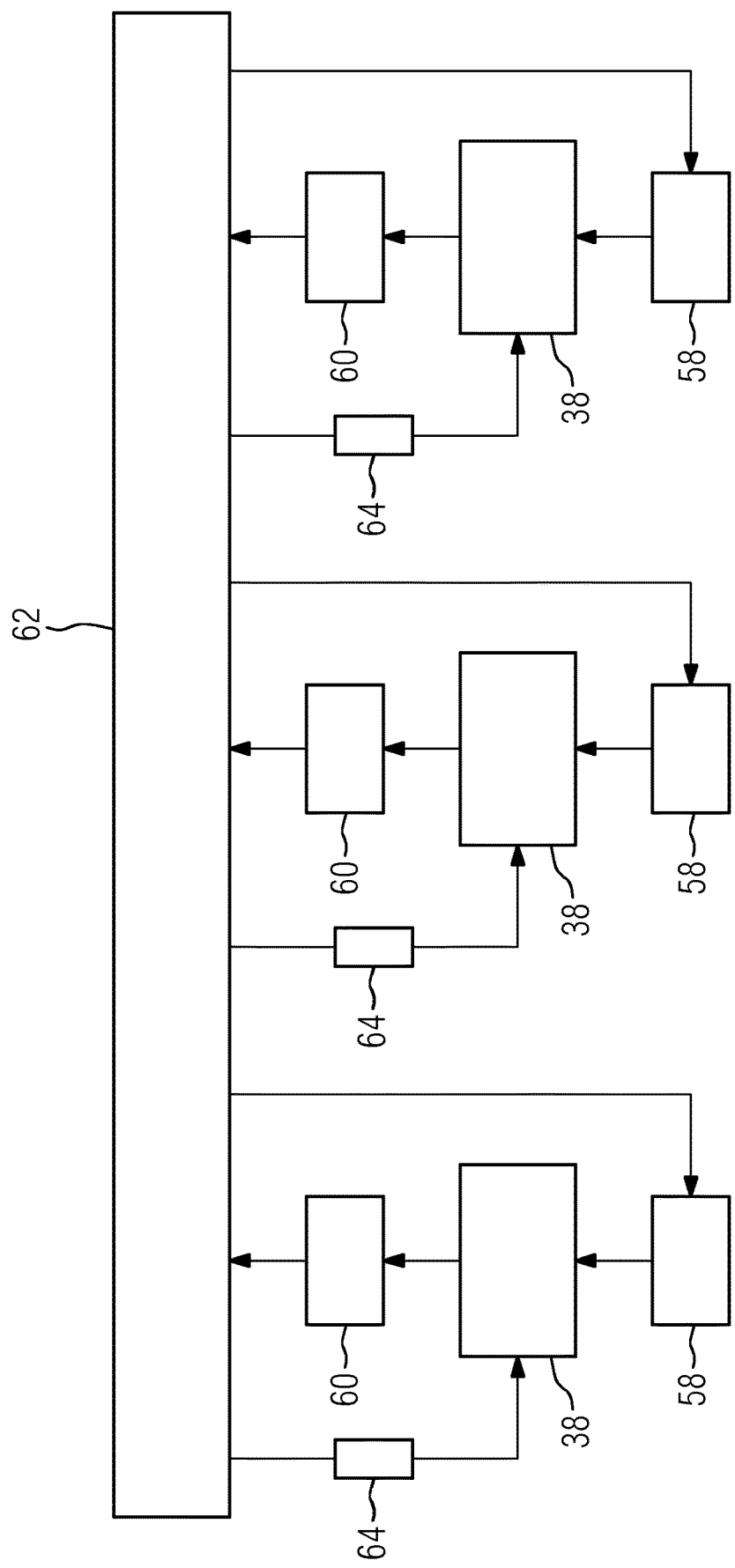
FIG. 4 shows a procedure for training computer units of the rail vehicle fleet.

FIG. 4 shows a procedure for training the computer units 38 of the rail vehicle fleet 2.

On the basis of FIG. 4, it is explained below how the computer unit 38 of the respective rail vehicle 4 is trained by means of a monitored machine learning method (from an initially untrained state) to select an action which, when applied to the state influencing system 14 of the same rail vehicle 4, contributes to the optimization of a total electrical energy balance of the state influencing systems 14 of the rail vehicle fleet 2.

A set of state parameters 58 is generated for each of the computer units 38 by a simulation unit 62 and is transmitted to the corresponding computer unit 38. The respective computer unit 38 selects an action to be applied to the state influencing system 14 of the same rail vehicle 4 depending on the state parameters 58 received by it and taking into account at least one predetermined target criterion for the rail vehicle 4 to which the computer unit 38 belongs.

On the basis of the actions selected by all computer units 38, the simulation unit 62 calculates a total electrical energy balance of the state influencing systems 14 of the rail vehicle fleet 2, on the basis of which a reward 64 is determined by the simulation unit 62 for each of the computer units 38, which is sent to the respective computer unit 38. The reward 64 received is used for the respective computer unit 38 as a basis for the evaluation of whether the action chosen by the computer unit 38 was useful with regard to the objective of optimizing the overall electrical energy balance of the state influencing systems 14 of the rail vehicle fleet 2.

The described process represents a single training run of the training of the computer units 38, wherein the training of the computer units 38 comprises multiple consecutive training runs of this type.

Although the invention was illustrated and described in detail by the exemplary preferred embodiment, the invention is not limited by the disclosed example and other variations may be derived from this without departing from the scope of protection of the invention.

The invention claimed is:

1. A method of an energy-optimized operation of a fleet of rail vehicles, the fleet of rail vehicles including n rail vehicles, the method which comprises:
   providing each of the n rail vehicles with a state influencing system for vehicle state influencing which can generate or consume electrical energy, and a computer unit trained by machine learning;
   with i being a natural number from 1 to n, and n being a natural number greater than 1, for all i from 1 to n during an operation of the rail vehicle fleet:
      while taking into account at least one target criterion for the rail vehicle and depending on state parameters selected from the group consisting of vehicle-related, location-related, and route-related state parameters, selecting with the computer unit of an i-th rail vehicle of the n rail vehicles an action to be applied to the state influencing system of the i-th rail vehicle, which contributes to optimizing a total electrical energy balance of the state influencing systems of the rail vehicle fleet when applied to the state influencing system of the i-th rail vehicle; and
      applying the selected action to the state influencing system of the i-th rail vehicle; and
   wherein the state parameters, in dependence on which the action is selected by the computer unit of the i-th rail vehicle, include a current contact line voltage at a location of the i-th rail vehicle or one or more statistical contact line voltage values at the location of the i-th rail vehicle.

2. The method according to claim 1, wherein the action selected by the computer unit of the i-th rail vehicle includes switching on one or more components of the state influencing system of the i-th rail vehicle, switching off one or more components of the state influencing system of the i-th rail vehicle, changing a control variable of one or more components of the state influencing system or changing an operating mode of one or more components of this state influencing system.

3. The method according to claim 1, wherein the at least one target criterion for the i-th rail vehicle relates to a timetable to be complied with by the i-th rail vehicle.

4. The method according to claim 1, which comprises selecting the action with the computer unit of the i-th rail vehicle by taking into account multiple target criteria for the i-th rail vehicle, wherein at least some of the target criteria are criteria selected from the group of criteria relating to a vehicle interior temperature of the i-th rail vehicle, a temperature of a vehicle component of the i-th rail vehicle, an upper limit for a contact line voltage at the location of the i-th rail vehicle, a lower limit for a contact line voltage at the location of the i-th rail vehicle, a permissible minimum distance from a rail vehicle ahead, and a permissible minimum distance from a following rail vehicle.

5. The method according to claim 1, wherein the state parameters, in dependence on which the action is selected by the computer unit of the i-th rail vehicle, include at least one parameter selected from the group consisting of a position of the i-th rail vehicle, a driving speed of the i-th rail vehicle, a braking system state of the i-th rail vehicle, at least one weather parameter at the location of the i-th rail vehicle, a distance from a rail vehicle ahead, a distance from a rail vehicle behind, at least one infrastructure parameter, and at least one route parameter.

6. The method according to claim 1, wherein the state influencing system of the respective rail vehicle comprises at least one electric traction motor and the selecting step comprises applying the action selected by the computer unit of the i-th rail vehicle to the traction motor of the state influencing system of the i-th rail vehicle to thereby change a driving speed of the rail vehicle.

7. The method according to claim 1, wherein the state influencing system of the respective vehicle comprises at least one braking system and the selecting step comprises applying the action selected by the computer unit of the i-th rail vehicle to the at least to the braking system of the rail vehicle to thereby reduce a driving speed of the rail vehicle.

8. The method according to claim 1, wherein the state influencing system of the respective vehicle comprises at least one energy store for providing electrical energy and the selecting step comprises applying the action selected by the computer unit of the i-th rail vehicle to the energy store of the state influencing system of the i-th rail vehicle, whereupon the energy store of the i-th rail vehicle is charged or discharged.

9. The method according to claim 1, wherein the computer unit of each of the n rail vehicles comprises an artificial neural network trained by a machine learning method, and the selecting step comprises selecting the action with the computer unit of the i-th rail vehicle using the artificial neural network.

10. The method according to claim 9, wherein the artificial neural network is a deep artificial neural network.

11. The method according to claim 9, which comprises:
   training the computer unit of the i-th rail vehicle from an initially untrained state by the machine learning method to select an action to be applied to the state influencing system of the i-th rail vehicle during operation of the rail vehicle fleet taking into account at least one target criterion for the i-th rail vehicle and depending on at least one of the vehicle-related, location-related, or track-related state parameters, so that the action, when applied to the state influencing system of the i-th rail vehicle, contributes to the optimization of the overall electrical energy balance of the state influencing system of the rail vehicle fleet.

12. The method according to claim 11, wherein the machine learning method for training the respective computer unit is a supervised machine learning method.

13. The method according to claim 11, wherein the training step comprises:
   carrying out a plurality of consecutive training runs;
   transmitting in each training run a set of state parameters to the computer unit of the i-th rail vehicle and selecting with the computer unit of the i-th rail vehicle an action which is to be applied to the state influencing system of the i-th rail vehicle depending on the state parameters received by the computer unit of the i-th rail vehicle and taking into account at least one target criterion for the i-th rail vehicle;

calculating in each training run an electrical total energy balance of the state influencing system of the rail vehicle fleet based on the actions selected by the computer units of the n rail vehicles during the respective training run and determining a reward for each of the computer units on the basis of the calculated total energy balance.

14. The method according to claim 13, which comprises generating the set of state parameters that is transmitted to the computer unit for the respective training run of the i-th rail vehicle by a simulation unit.

15. A rail vehicle fleet, comprising:

n rail vehicles each having a state influencing system for vehicle state influencing which can generate or consume electrical energy and a computer unit trained by way of a machine learning method;

with i being a natural number from 1 to n, and n being a natural number greater than 1;

for all i from 1 to n, said computer unit of an i-th rail vehicle of said n rail vehicles being configured to select an action to be applied to said state influencing system of said i-th rail vehicle during an operation of the rail vehicle fleet taking into account at least one target criterion for the i-th rail vehicle and in dependence on one or more state parameters selected from the group consisting of vehicle-related, location-related, and route-related state parameters, the action contributing to an optimization of a total electrical energy balance of said state influencing system of the rail vehicle fleet when applied to said state influencing system of said i-th rail vehicle; and wherein the state parameters, in dependence on which the action is selected by said computer unit of the i-th rail vehicle, include a current contact line voltage at a location of the i-th rail vehicle or one or more statistical contact line voltage values at the location of the i-th rail vehicle.

* * * * *